Patented Dec. 5, 1950

2,532,396

UNITED STATES PATENT OFFICE 2,532,396

UREA-FORMALDEHYDE RESINS OF HIGH NAPHTHA TOLERANCE

George Edward Eilerman, Milwaukee, Wis., assignor to Pittsburgh Plate Glass Company, Allegheny County, Pa., a corporation of Pennsylvania No Drawing. Application October 13, 1948, Serial No. 54,357

12 Claims. (Cl. 260—70)

The present invention relates to the preparation of urea-formaldehyde resins and it has particular relation to the preparation of such resins when they are to be employed as components of coating compositions.

One object of the invention is to provide urea-formaldehyde resins which in solution will withstand the addition of large amounts of naphtha solvents especially of naphtha solvents of low Kauri-Butanol value without precipitation of the resin from solution.

A second object of the invention is to provide a method of forming urea-formaldehyde resins which does not require the use of special alcohols as a reaction media, but results in products having a high tolerance for naphtha.

A third object of the invention is to provide urea-formaldehyde resins of relatively high compatibility with a large variety of synthetic and natural resins.

A fourth object of the invention is to prepare a urea-formaldehyde resin solution which will comprise a high proportion of total solids, but which will still be of relatively low viscosity.

A fifth object of the invention is to modify urea-formaldehyde resins with other aldehydes higher than formaldehyde and ketones by a condensation reaction after the urea-formaldehyde resin has been prepared.

Urea-formaldehyde resin coating composition as known to the trade comprise solutions of the resins in solvents such as butyl alcohol and xylene. For purposes of reducing the costs in preparing the solution, it is desirable to include diluents such as naphtha of comparatively low Kauri-Butanol value. However, with the conventional resins only limited amounts of naphtha can be incorporated without a tendency to induce precipitation, thus destroying the gloss of the enamel coatings obtained from the solutions or causing the precipitation of "seed" in the enamel on standing.

The urea-formaldehyde resins which are commonly employed in the coating industry are customarily plasticized with alkyd resins which comprise polyesters of glycerol and phthalic acid modified by a glyceride oil and notably drying or semi-drying glyceride oil such as linseed oil or soybean oil. The conventional urea-formaldehyde resins tend to be incompatible with the alkyd resins as the proportion of oil in the latter is increased. This is objectionable because, in many instances, it is desirable to employ alkyds relatively low in glyceryl phthalate and correspondingly high in oil content.

It has heretofore been proposed to provide urea-formaldehyde resins which will tolerate considerable proportions of naphtha in the solutions thereof by effecting the condensation of the urea and formaldehyde in the presence of alcohols of relatively high molecular weight such as octyl alcohol. A mixture of octyl and butyl alcohols was quite effective for the purpose. These special alcohols were comparatively expensive.

The present invention contemplates the provision of a process of preparing urea-formaldehyde resins which will withstand thinning with large amounts of naphtha solvents and which are compatible with oil modified alkyd resins and other resins and gums of the paint and varnish industry without resort to the use of high molecular weight alcohols as a medium in which to effect condensation of the urea and formaldehyde; or if such high molecular weight alcohols are employed permitting the preparation of urea-formaldehyde resins which have high tolerance for naphtha and oil modified alkyd resins. It is based upon the discovery that urea-formaldehyde resins having high naphtha tolerance and compatibility with alkyds and notably the long oil alkyds can be prepared by effecting a preliminary condensation of the urea and formaldehyde preferably in a proportion of approximately 1 mol of urea to 2 mols formaldehyde and then incorporating an additional aldehyde and effecting further reaction.

In the preparation of a urea-formaldehyde condensation product in accordance with the provisions of the present invention, an appropriate reaction vessel is provided. For small scale operations illustrative of the principles of the invention, an ordinary three-neck laboratory flask may be employed. One neck is provided with a dropping funnel or other connection by means of which formaldehyde can be allowed to flow in gradually substantially as it is reacted with the urea in the flask. Another neck preferably, is equipped with a reflux condenser designed to condense and return alcohol or other solvents or reaction components less volatile than water. It is desirable that the condenser be so operated as to permit the escape of much or most of the water introduced with the formaldehyde or liberated in the course of the reaction. To this end it may be equipped with a water trap. The remaining neck of the flask is equipped with an appropriate agitator mechanism such as an ordinary stirrer.

The first stage of the process proceeds along conventional lines as commonly employed in the preparation of urea-formaldehyde resins. Urea is introduced into the reaction vessel along with a reaction medium. Butyl alcohol is one of the best solvents, but others such as isobutyl alcohol, n-amyl alcohol, and its various isomers, hexylalcohol and isomers thereof, n-heptyl alcohol and isomers, n-octylalcohol or its isomers, etc., may partially or completely replace the butyl alcohol. Since these higher alcohols tend to be expensive, they usually are not employed except when it may be desired to provide a product of exceptional compatibility. Where they are mixed with butyl alcohol, they may be in a proportion of for example, of 5 to 95% by weight of the solvent medium.

The preparation of the initial resin may conveniently be divided into two stages: In the first, formaldehyde is added and initially reacted. In the second, resinification is effected.

Only enough solvent to dissolve the mixture need be employed during the addition of the formaldehyde. The reaction mixture may be neutral or nearly so. The formaldehyde may be dripped in as it reacts. The temperature should not be so high as to cause violent ebulition in the reaction vessel. About two mols of formaldehyde per mol of urea may be added. A ten or twenty per cent excess can be added. Therefore, the range of formaldehyde will be from 2 to 2.4 moles for mole of urea.

During these initial stages, methylol ureas such as monomethylol and dimethylol ureas are probably formed in large amounts. They probably constitute the main reaction product.

The use of aqueous formaldehyde has been described. It is to be understood that the substitution of polymers of formaldehyde and formaldehyde forming substances, e. g., paraformaldehyde is contemplated.

When the desired amount of formaldehyde has been added, the second stage of condensation is initiated. To this end, the reaction mixture is further diluted with additional medium as butyl alcohol, or others herein mentioned, which preferably includes a catalyst of esterification such as an acid, e. g. sulfuric acid, hydrochloric acid or othophosphoric acid.

During condensation, water is evolved and is removed from the system, by evaporation. It may be allowed to escape as vapor from the reflux condenser or may be trapped out of the condenser as liquid. The solvent is returned to the system, at least until near the end of the reaction.

Reaction is continued in this stage until all or most of the water of reaction is evolved and eliminated from the system.

The cessation or slowing down of water removal is easily observed and is a criterion for initiation of the second phase of the process. At this stage the product is a resin but is still a soluble liquid.

The second addition of aldehyde can now be effected. The aldehyde in this stage may be formaldehyde or one of the other aldehydes such as are herein described. They may be in a proportion of 0.5 to 2 or 3 mols based upon the urea employed originally. They may be added gradually or all at once. Preferably additional solvent medium is added at the same time. Acid catalyst to keep up the concentration may be included.

Reaction is continued until all or most of the water of condensation is again removed but should be stopped before a solid or excessively viscous product is formed.

The product may retain all of the reaction medium to provide a highly fluid product. However it may also be evaporated down to an appropriate solids content, e. g. 40 to 65%.

The product is a liquid of low viscosity, considering its solids content, is soluble in butyl alcohol and other solvents, has a high tolerance for naphtha of low Kauri-Butanol value and is compatible with oil modified phthalic glyceride resins of much greater oil length than the usual urea-formaldehyde.

THE EXAMPLES

In order to demonstrate the efficiency of the present process in producing resins having high tolerance for naphtha diluents a control run was conducted substantially as follows:

EXAMPLE I

In this test, 120 gms. of urea were introduced into the reaction container and 567 gms. of formaldehyde of a pH of 7.0 and of a concentration of 37% were added slowly. The formaldehyde was in a proportion of 3.5 mols per mol of urea. This mixture was heated to reflux for a period of about 30 minutes. At the end of this time, butyl alcohol containing an acid catalyst such as a small amount of sulfuric acid, hydrochloric acid, acetic acid, or preferably orthophosphoric acid was added. In the specific example 300 parts by weight of butyl alcohol and .8 part by weight of phosphoric acid were employed. The mixture was again heated to refluxing and the water of reaction was separated. After a period of about 5 to 6 hours the reaction was completed as evidenced by the fact that water no longer was evolved. Finally, 350 parts of butyl alcohol was distilled.

There remained a resin which was viscous and which was cooled to 100° C. and thinned with 84 parts of xylene. This solution comprised 60 to 64% solids and had a naphtha tolerance of 145. Naphtha tolerance as herein expressed is determined by adding naphtha of a boiling range of 311 to 410° F. and of a Kauri-Butanol value of 36 until resin begins to precipitate. The naphtha tolerance is expressed as cc.'s of naphtha of the foregoing grade required to effect precipitation of resin in a solution comprising 30 grams of resin solution thinned with 20 cc. of xylene.

EXAMPLE II

In accordance with the provisions of the present invention, a charge consisting of 60 grams of urea, 165 grams of formalin of 37% concentration, pH 7.0 and 100 cc. of butyl alcohol were reacted for 30 minutes. Subsequently 100 cc. of butyl alcohol containing .4 cc. of orthophosphoric acid of 85% concentration were added and refluxing was continued with separation of water until water ceased to evolve.

41.5 grams of formalin, pH 7.0 and 40 cc. of butanol were added and the mixture again refluxed with separation of water until no water was given off. At the conclusion, 85 cc. of butyl alcohol were distilled and 49 grams of xylene were added. The resultant solution comprised 60% solids and on the basis above described had a naphtha tolerance of 235.

EXAMPLE III

In this example, 120 grams of urea, 340.2 grams of formaldehyde (37% concentration) of a pH of 7.0, 200 cc. of butyl alcohol were refluxed for 30 minutes and there was then added 200 cc. of butyl alcohol containing .8 cc. of orthophosphoric acid of 85% concentration. This mixture refluxed until no more water separated.

At this point 228 grams of formaldehyde, pH 7.0 and 200 cc. of butyl alcohol were added. The reaction was again continued until no more water separated.

350 cc. of butyl alcohol were distilled off from the reaction mixture and 84 cc. of xylene were added. The mixture was of a total solids content of 60 to 62% and had a naphtha tolerance greater than 300.

The practice of the invention is not limited to the use of formaldehyde in the second addition of aldehyde component. Other aldehydes may conveniently be substituted. Such substitute aldehydes would include open chain aldehydes, e. g. caprylic aldehyde, n-heptaldehyde, isobutyraldehyde, n-valeraldehyde, trimethyl-acetaldehyde, butyraldehyde, the various valeraldehydes, propylaldehyde, aldol, croton aldehyde, benzyl aldehyde, nitrobenzaldehyde, metachlorobenzaldehyde. The various chlorinated aliphatic aldehydes such as chloral hydrate (which reacts as chloral) butyrchloral may be employed.

Aromatic aldehydes including benzaldehyde, ortho, or meta nitrobenzaldehyde and others are also contemplated. It is also to be understood that ketones such as acetone, methyl ethyl ketone, methyl isopropyl ketone and others may be substituted for the aldehydes. Any of the aldehydes or their equivalents herein enumerated may be added in this second stage in a proportion for example of .5 to 2 or even 3 mols. A proportion of approximately 1.5 or 2 mols of the aldehyde in the second stage in addition is convenient for the purposes of the present invention.

The following examples illustrate substitutions of various aldehydes in the second stage of the reaction:

EXAMPLE IV

In this example, 60 grams of urea, 165 grams of formaldehyde of 37% and pH of 7.0, 100 cc. of butyl alcohol were reacted in the foregoing apparatus for 30 minutes. The mixture was then further reacted with 100 cc. of butyl alcohol and .4 cc. of orthophosphoric acid until no more water could be separated.

At the conclusion of this operation 57 grams of n-heptaldehyde, 50 grams of butyl alcohol were added. The mixture was again refluxed with removal of water until water substantially ceased to evolve. At the conclusion 80 cc. of butyl alcohol was distilled to provide a composition of 55% solvents. This solution could be thinned with xylene in practically any desired ratio of butyl alcohol to xylene.

EXAMPLE V

In this example, preliminary reaction of 60 grams of urea, 165 grams of formaldehyde, 100 cc. of butyl alcohol were effected as above described over a period of 30 minutes after which the reaction mixture was diluted with 200 cc. of butyl alcohol and .4 cc. of orthophosphoric acid, .85 of concentration. The reaction was continued until water was removed.

At the conclusion of the operation, 45 grams of metanitrobenzaldehyde and 75 cc. of butyl alcohol were added and the reaction was continued again until no more water separated. Subsequently 125 cc. of butyl alcohol were distilled to provide a product containing 60% solids. The resultant solution could be thinned with xylene to give any desired ratio of butyl alcohol to xylene.

EXAMPLE VI

In this example, urea-formaldehyde resin was prepared as in stage 1 of Example V and to the resultant solution of resin and butyl alcohol, 50 grams of chloral hydrate 50 c. c. of butyl alcohol were added. The mixture was again refluxed until no more water separated from the resin mixture. 75 cc. of butyl alcohol was distilled to provide a product comprising 48% total solids. This solution could be extensively thinned with xylene.

The resins as previously described can be incorporated with alkyd resins of considerable oil length. For example, an oil modified alkyd of the following characteristics was prepared:

Alkyd A

In the preparation of a long oil alkyd, 367 parts by weight of soybean oil was alcoholized or glycerized by heating the oil with 74 parts by weight of glycerin and a small amount (e. g., .1 part by weight) of litharge which constituted a catalyst of ester exchange. The ester exchange involved is well understood by those skilled in the art. Further description thereof is not deemed to be necessary. To the resultant product a monoglyceride, or diglyceride or mixture thereof was added 134 parts by weight of phthalic anhydride and 14 parts by weight of maleic anhydride. The maleic anhydride could be omitted if desired. The mixture was heated until water of reaction began to evolve and heating was continued with continuous removal of the water until a sample when withdrawn and thinned with naphtha, to provide a vehicle of 70% solids exhibited a viscosity of Z according to the Gardner-Holdt scale. This alkyd was then combined with urea-formaldehyde resins, which could be any one of those described in the Examples I to VI inclusive and in which it was soluble.

EXAMPLE VII

A mixture of the foregoing long oil alkyd (A), comprising 30 parts of alkyd in admixture with naphtha to provide a mixture of 70% solids was admixed with a naphtha mixture of urea-formaldehyde resin (of high naphtha tolerance of any of the Examples I to VI) and comprising 60% solids in the naphtha. This mixture could be sprayed or otherwise applied to surfaces of wood or iron or the like and cured by baking for 30 minutes at a temperature of 300° F. Higher or lower temperatures, e. g. 200 to 350° F. could be employed. The resultant films were homogeneous and showed no signs of incompatibility. Films were also applied in similar manner and were air dried at normal room temperature. The resultant dried films were homogeneous.

EXAMPLE VIII

In this example 30 parts by weight of the alkyd resin in a naphtha mixture containing 70% solids was combined with 18 parts by weight of urea-formaldehyde resin (any one of the examples from I to VI) in naphtha mixture made up to a concentration of 60% solids. These mixtures could be applied to wood, metal and the like and baked or air dried as described in connection with Example VII.

EXAMPLE IX

In this example 30 parts by weight of alkyd resin of long oil content made up as above described and comprising a mixture in naphtha of 70% solids was admixed with 53 parts by weight of urea-formaldehyde as above described and of a concentration of 60% solids in naphtha. It too was applied by spraying and could be baked at 350° F. or air-dried as occasion might warrant.

*Alkyd B*

Another example of a long oil alkyd was prepared as follows:

Alkali refined linseed oil in a proportion of 316 parts by weight was alcoholized with glycerol to the lower glycerides, e. g. mono or diglyceride by heating with 91 parts of glycerin in the presence of .1 part by weight of litharge which constituted a convenient catalyst for the reaction. The resultant mono or diglycerides were admixed with 200 parts by weight of phthalic anhydride while the water of reaction which was evolved was continuously withdrawn. Samples were withdrawn from time to time and subjected to tests by thinning with naphtha to provide a solution of 55% solids content and then determining viscosity. When the viscosity as determined on the Gardner-Holdt scale, reached the value of W in the test, the reaction was stopped. The resultant long oil alkyd could be made up to a 55% solids content with naphtha and the resultant solution admixed with urea-formaldehyde from the preceding Examples I to VII made up in solution with naphtha to a 60% solids content.

EXAMPLE X

In this example 33 parts by weight of alkyd B solution prepared as above described was combined with 30 parts by weight of urea-formaldehyde resin. These vehicles could be thinned with naphtha to operating viscosity and after application to appropriate surfaces, could be baked to hard state at 350° F. for 30 minutes. The films were homogeneous and showed no signs of incompatibility.

EXAMPLE XI

In this example 33 parts by weight of alkyd prepared as above described was admixed with 15 parts by weight of urea-formaldehyde. This mixture was treated as described in connection with Example X and the results were substantially similar.

EXAMPLE XII

In this example 33 parts by weight of alkyd resin were combined with 45 parts by weight of urea-formaldehyde. The solution was thinned and applied by spraying or other modes of application could be employed. The films bake readily at 350° F. at a period of 30 minutes. The films were homogeneous and showed no signs of incompatibility.

The compositions of Examples I to XII inclusive could be combined with pigments such as titanium dioxide, lead oxide, driers as oil soluble salts, e. g. oleates, linoleates, naphthenates, etc. of cobalt, nickel, lead, chromium and the like in amounts of .1 to .5% or more to provide good paints and varnishes.

The embodiments of the invention described constitute typical examples. Numerous modifications may be made therein without departing from the spirit of the invention or the scope of the claims.

I claim:

1. A process as defined in claim 10 in which the additional aldehyde is formaldehyde.
2. A process as defined in claim 10 in which the additional aldehyde is heptaldehyde.
3. A process as defined in claim 10 in which the additional aldehyde is nitrobenzaldehyde.
4. A process as defined in claim 10 in which the additional aldehyde is chloral.
5. A process as defined in claim 12 in which the second condensation is effected under atmospheric pressure.
6. The steps as defined in claim 12 in which the aldehyde in the second step in formaldehyde.
7. The steps as defined in claim 12 in which the aldehyde in the second step is heptaldehyde.
8. The steps as defined in claim 12 in which the aldehyde in the second step is nitrobenzaldehyde.
9. The steps as defined in claim 12 in which the aldehyde is chloral.
10. A method of preparing a urea formaldehyde resin which has a high tolerance for naphtha, which method comprises initially condensing approximately 2 mols of formaldehyde with 1 mol of urea dissolved in butyl alcohol, by refluxing the mixture with removal of water of condensation to the point at which water ceases to evolve but the product is still liquid, then adding .5 to 3 mols of additional aldehyde and again condensing the mixture with removal of water of reaction until water ceases to evolve.
11. A process of preparing urea formaldehyde resin of high naphtha tolerance, which comprises condensing 1 mol of urea and 2 to 2.4 mols of formaldehyde dissolved in an alkyl monohydric alcohol containing 4 to 8 carbon atoms per molecule, by refluxing the mixture with distillation of water until water ceases to evolve but the product is still liquid, then reacting the resultant product with .5 to 3 moles of additional aldehyde until water again ceases to evolve.
12. In a process of preparing a urea formaldehyde resin of high naphtha tolerance, the steps which comprise condensing 1 mol of urea and 2 mols of formaldehyde dissolved in butyl alcohol, the urea and alcohol being in the rate of 60 grams of urea to 200 cc. of butyl alcohol, condensation being effected by refluxing the mixture with distillation and removal of water until water ceases to evolve, then adding .5 to 3 mols of additional aldehyde and again refluxing the mixture with distillation and removal of water, until water ceases to evolve.

GEORGE EDWARD EILERMAN.

REFERENCES CITED

The following references are of record in the file of this patent:

UNITED STATES PATENTS

| Number | Name | Date |
|---|---|---|
| 2,009,173 | Gams et al. | July 23, 1935 |
| 2,088,036 | Saunders | July 27, 1937 |
| 2,171,882 | Ludwig | Sept. 5, 1939 |
| 2,222,506 | Hodgins et al. | Nov. 19, 1940 |

OTHER REFERENCES

Ser. No. 395,732, Kern (A. P. C.), published Apr. 20, 1943.